US008971908B1

(12) United States Patent
Kirkpatrick et al.

(10) Patent No.: US 8,971,908 B1
(45) Date of Patent: Mar. 3, 2015

(54) APPARATUS AND METHOD FOR CONFIGURING NETWORK CONNECTION PARAMETERS OF A MOBILE DEVICE

(71) Applicants: Ficus Kirkpatrick, San Francisco, CA (US); Aurash Mahbod, San Jose, CA (US)

(72) Inventors: Ficus Kirkpatrick, San Francisco, CA (US); Aurash Mahbod, San Jose, CA (US)

(73) Assignee: Google Inc., Mountain View, CA (US)

( * ) Notice: Subject to any disclaimer, the term of this patent is extended or adjusted under 35 U.S.C. 154(b) by 122 days.

(21) Appl. No.: 13/745,019

(22) Filed: Jan. 18, 2013

Related U.S. Application Data

(60) Provisional application No. 61/735,742, filed on Dec. 11, 2012.

(51) Int. Cl.
*G06F 15/16* (2006.01)
*H04W 76/06* (2009.01)

(52) U.S. Cl.
CPC .................................. *H04W 76/068* (2013.01)
USPC ..................................... 455/452.1; 455/452.2

(58) Field of Classification Search
USPC ............ 455/452.1, 452.2; 370/229, 232, 412, 370/462
See application file for complete search history.

(56) References Cited

U.S. PATENT DOCUMENTS

| 6,526,433 | B1 | 2/2003 | Chang et al. |
| 7,881,738 | B2 | 2/2011 | Santhanam |
| 7,953,870 | B1 | 5/2011 | Reeves et al. |
| 2002/0105914 | A1 | 8/2002 | Duron |
| 2004/0017784 | A1 | 1/2004 | Backlund |
| 2006/0031553 | A1 | 2/2006 | Kim |
| 2008/0147946 | A1* | 6/2008 | Pesavento et al. ............ 710/265 |
| 2010/0257525 | A1 | 10/2010 | Yin et al. |

* cited by examiner

*Primary Examiner* — Sam Bhattacharya
(74) *Attorney, Agent, or Firm* — Remarck Law Group PLC

(57) ABSTRACT

According to some embodiments of the present disclosure, techniques for determining a timeout value for a mobile device are disclosed. The techniques include receiving a request for a timeout value from a mobile device. The request includes a current network provider identifier and a first current connection type identifier. The techniques further include accessing an analytics database that stores a plurality of realized latency values, each realized latency value corresponding to a different previously performed network operation. Each realized latency value has a network provider identifier indicating a network provider and a connection type identifier indicating a type of associated therewith. The techniques further include retrieving one or more of the plurality of realized latency values from the analytics database based on the current network provider identifier and the first connection type identifier. The techniques also include determining the timeout value based on the retrieved realized latency.

20 Claims, 4 Drawing Sheets

APPARATUS AND METHOD FOR CONFIGURING NETWORK CONNECTION PARAMETERS OF A MOBILE DEVICE

CROSS-REFERENCE TO RELATED APPLICATIONS

This application claims the benefit of U.S. Provisional Application No. 61/735,742, filed on Dec. 11, 2012. The entire disclosure of the above application is incorporated herein by reference.

FIELD

The present disclosure relates to an apparatus and method for configuring network connection parameters of a mobile device and, in particular, for configuring timeout values for the mobile device based on different criteria.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Currently, most mobile devices are preconfigured with many different network connection parameters, including a timeout value. A timeout value defines an amount of time that a mobile device will wait for a response to a network operation before timing out the network operation. For example, the mobile device may be configured to wait one and a half seconds for a response to a network operation before retransmitting the request or taking another action. When the mobile device does not receive a response to a network operation, the mobile device assumes that either the network operation or a response thereto was lost in transmission or otherwise corrupted.

One issue with selecting a timeout value for a mobile device (or any network device) is selecting a timeout value that reduces the amount of network operations that are erroneously timed out while at the same time reduces the amount of time that is spent by the mobile device waiting for a response before correctly timing out the network operation. For example, when the mobile device is configured with a timeout value that is relatively low, e.g., 0.25 seconds, a greater amount of network operations may be erroneously timed out by the mobile device. Conversely, if the mobile device is configured with a timeout value that is relatively high, e.g., 2.5 seconds, the mobile device may wait too long before timing out a network operation, which may result in noticeable delays to a user of the mobile device.

SUMMARY

According to some embodiments of the present disclosure, techniques for determining a timeout value for a mobile device are disclosed. In some embodiments, the techniques include receiving, at a processing device of a computing device, a request for a timeout value from a mobile device, the request including a current network provider identifier indicating a current network provider of the mobile device and a first current connection type identifier indicating a first type of connection used by the mobile device to access a communication network. The timeout value is indicative of an amount of time that the mobile device waits for a response to a network operation before timing out the network operation when using the first type of connection to access the communication network. The techniques further include accessing, at the computing device, an analytics database. The analytics database stores a plurality of realized latency values, each realized latency value corresponding to a different previously performed network operation performed by one of a plurality of reporting mobile devices and defining a realized latency value of the previously performed network operation. Each realized latency value has a network provider identifier indicating a network provider of the reporting mobile device used to perform the previously performed network operation and a connection type identifier indicating a type of connection used by the reporting mobile device to perform the previously performed network operation associated therewith. The techniques further include retrieving, at the computing device, one or more of the plurality of realized latency values from the analytics database based on the current network provider identifier and the first connection type identifier, each of the one or more retrieved realized latency values having the current network provider identifier and the first current connection type identifier associated therewith. The techniques also include determining, at the computing device, the timeout value based on the one or more retrieved realized latency values and providing, at the computing device, the timeout value to the mobile device.

In some embodiments, the techniques further include receiving, at the computing device, a new realized latency value, a new network provider identifier, and a new connection type identifier from one of the plurality of reporting mobile devices. The techniques further include storing, at the computing device, the new realized latency value, the new network provider identifier, and the new connection type identifier in the analytics database, and associating, at the computing device, the new network provider identifier and the new connection type identifier with the new realized latency value.

According to some embodiments of the present disclosure, each one of the plurality of realized latency values stored in the analytics database has a device type identifier associated therewith, the device type identifier indicating a make and model of the one reporting mobile device that performed the previously performed network operation to which the realized latency value corresponds.

According to some embodiments of the present disclosure the request for the timeout value includes a current device type identifier of the mobile device indicating a current make and model of the mobile device. Further, each of the one or more retrieved realized latency values have the current device type identifier associated therewith.

According to some embodiments of the present disclosure includes a request for a second timeout value and a second current connection type identifier indicating a second type of connection used by the mobile device to access the communication network, the second timeout value being indicative of a second amount of time that the mobile device waits for a response to a second network operation before timing out the second network operation when using the second type of connection to access the communication network.

In some embodiments, the techniques further include retrieving, at the computing device, one or more other realized latency values from the analytics database based on the current network provider identifier and the second current connection type identifier, each of the one or more other realized latency values having the current network provider identifier and the second current connection type identifier associated therewith. The techniques further include determining, at the computing device, the second timeout value based on the other realized latency values and providing, at the computing device, the second timeout value to the mobile device.

According to some embodiments of the present disclosure each one of the plurality of realized latency values stored in the analytics database has a geographic area identifier associated therewith, the geographic area identifier indicating a geographic area from which the one reporting mobile device performed the previously performed network operation to which the realized latency value corresponds.

In some embodiments the request for the timeout value includes a current geographic area identifier of the mobile device indicating a geographic area where the mobile device most frequently performs network operations and each of the one or more retrieved realized latency values have the current geographic area identifier associated therewith.

In some embodiments determining the timeout value further includes selecting the timeout such that a specific percentage of responses corresponding to the retrieved realized latency values would have been received before network operations corresponding to the retrieved realized latency value would have been timed by the reporting mobile device.

According to some embodiments of the present disclosure the computing device is one of the mobile device and an update server.

According to some embodiments of the present disclosure, techniques for determining a timeout value for a mobile device are disclosed. The techniques include an analytics database that stores a plurality of realized latency values, each realized latency value corresponding to a different previously performed network operation performed by one of a plurality of reporting mobile devices and defining a realized latency value of the previously performed network operation. Each realized latency value has associated therewith a network provider identifier indicating a network provider of the reporting mobile device used to perform the previously performed network operation and a connection type identifier indicating a type of connection used by the reporting mobile device to perform the previously performed network operation. The techniques further include a processing device configured to receive a request for a timeout value from a mobile device, the request including a current network provider identifier indicating a current network provider of the mobile device and a first current connection type identifier indicating a first type of connection used by the mobile device to access a communication network, the timeout value being indicative of an amount of time that the mobile device waits for a response to a network operation before timing out the network operation when using the first type of connection to access the communication network. The processing device is further configured to access the analytics database and retrieve one or more of the plurality of realized latency values from the analytics database based on the current network provider identifier and the first connection type identifier, each of the one or more retrieved realized latency values having the current network provider identifier and the first current connection type identifier associated therewith. The processing device is further configured to determine the timeout value based on the one or more retrieved realized latency values and provide the timeout value to the mobile device.

According to some embodiments of the present disclosure the processing device is further configured to receive a new realized latency value, a new network provider identifier, and a new connection type identifier from one of the plurality of reporting mobile devices. The processing device is further configured to store the new realized latency value, the new network provider identifier, and the new connection type identifier in the analytics database and associate the new network provider identifier and the new connection type identifier with the new realized latency value.

According to some embodiments of the present disclosure, each one of the plurality of realized latency values stored in the analytics database has a device type identifier associated therewith, the device type identifier indicating a make and model of the one reporting mobile device that performed the previously performed network operation to which the realized latency value corresponds.

According to some embodiments of the present disclosure the request for the timeout value includes a current device type identifier of the mobile device indicating a current make and model of the mobile device, and each of the one or more retrieved realized latency values have the current device type identifier associated therewith.

According to some embodiments of the present disclosure, the request includes a request for a second timeout value and a second current connection type identifier indicating a second type of connection used by the mobile device to access the communication network, the second timeout value indicating a second maximum amount of time that the mobile device waits for a response to a second network operation before timing out the second network operation when using the second type of connection to access the communication network.

According to some embodiments of the present disclosure the processing device is further configured to retrieve one or more other realized latency values from the analytics database based on the current network provider identifier and the second current connection type identifier, each of the one or more other realized latency values having the current network provider identifier and the second current connection type identifier associated therewith. The processing device is further configured to determine the second timeout value based on the other realized latency values and provide the second timeout value to the mobile device.

According to some embodiments of the present disclosure each one of the plurality of realized latency values stored in the analytics database has a geographic area identifier associated therewith, the geographic area identifier indicating a geographic area from which the one reporting mobile device performed the previously performed network operation to which the realized latency value corresponds.

According to some embodiments of the present disclosure, the request for the timeout value includes a current geographic area identifier of the mobile device indicating a geographic area where the mobile device most frequently performs network operations. Furthermore, each of the one or more retrieved realized latency values have the current geographic area identifier associated therewith.

According to some embodiments of the present disclosure the processing device is configured to determine the timeout value by selecting the timeout such that a specific percentage of responses corresponding to the retrieved realized latency values would have been received before network operations corresponding to the retrieved realized latency value would have been timed by the reporting mobile device.

According to some embodiments of the present disclosure, techniques for determining a timeout value for a mobile device is disclosed the computing device is one of the mobile device and an update server.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
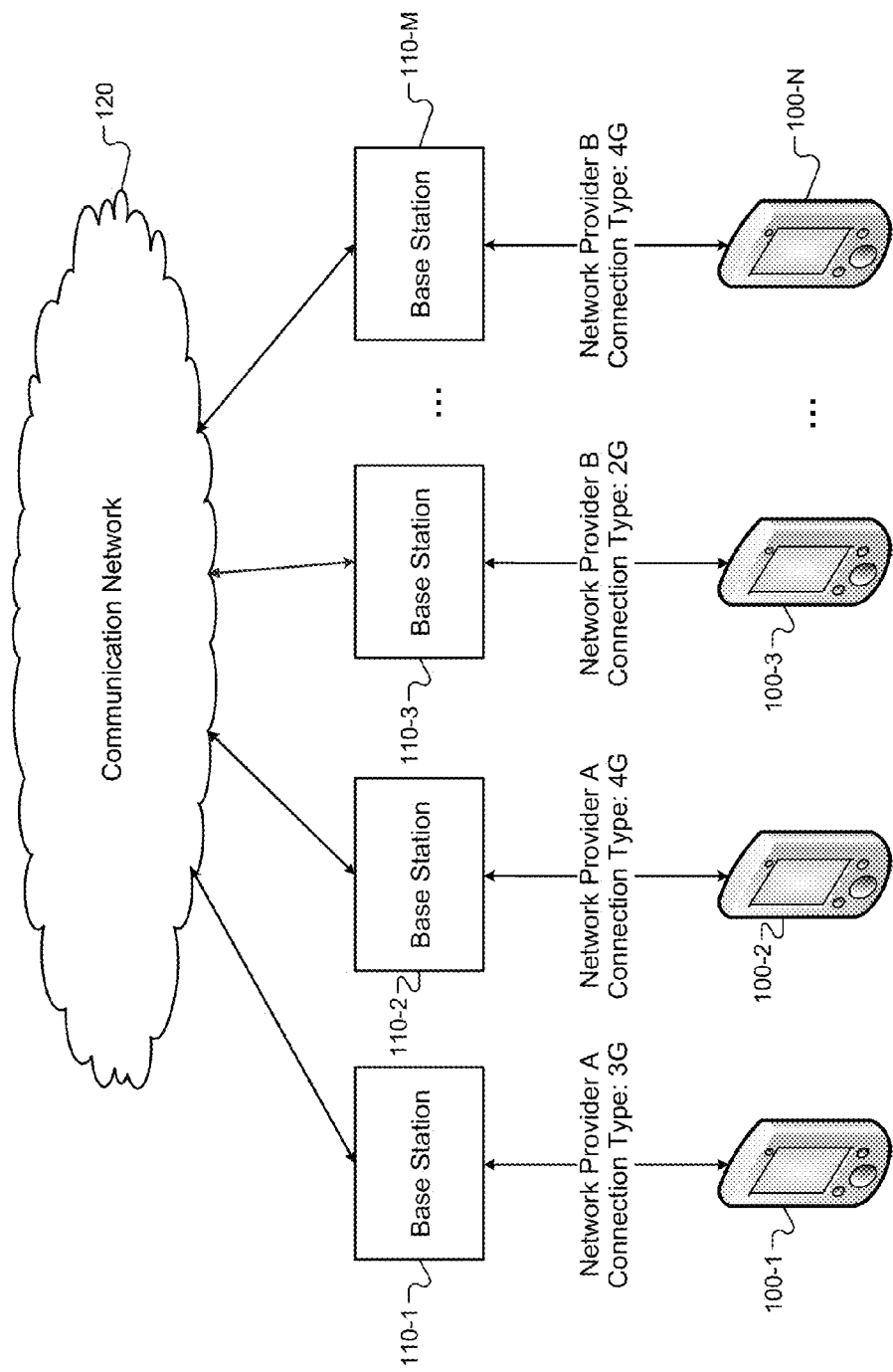
FIG. 1 is a drawing illustrating a plurality of mobile devices connected to a communication network according to some embodiments of the present disclosure.

FIG. 1 shows a plurality of mobile devices, e.g., mobile device 100-1, mobile device 100-2, mobile device 100-3 . . . mobile device 100-N (generically referred to as "mobile device 100"), connected to a communication network 120, e.g., the Internet, via a plurality of base stations, e.g., base station 110-1, base station 110-2, base station 110-3 . . . base station 110-M (generically referred to as "base station 110"). A mobile device 100 can be any portable computing device having one or more processors and communication capabilities. As used herein, the term "mobile device" can include, but is not limited to, a mobile telephone, a tablet computing device, a laptop computer, a personal digital assistant (PDA), or a portable video gaming device.

A base station 110 is a device which acts as a gateway between the mobile device 100 and the communication network 120. For example, the term "base station" can refer to a cellphone tower or a gateway router. A base station 110 can include one or more transceivers which allow the base station 110 to relay data packets to and from the mobile device 100. A mobile device 100 can communicate with other network devices via the communication network 120 by connecting to the base station 110. The base station 110 may also be connected to a network furnished by a network provider. Communications from the mobile device 100, e.g., mobile device 100-1, are transmitted to a base station 110, e.g., base station 110-1, and to the communication network 120 via the network of the network provider.

A network provider may offer more than one network or "connection type" to which a mobile device 100 can connect. For example, many network providers offer a second generation ("2G") network, a third generation ("3G") network, and a fourth generation ("4G") network to which a mobile device can connect. As should be appreciated, a 2G network is a network that operates according to the second generation of mobile telecommunications standards. A 3G network is a network that operates according to the third generation of mobile telecommunications standards. A 4G network is a network that operates according to the fourth generation of mobile telecommunications standards. The foregoing list of connection types is not intended to be limiting, and other connection types, now known or later developed, are within the scope of the disclosure.

In the illustrated example, mobile device 100-1 is shown as being connected to base station 110-1, which is a base station 110 of "Network Provider A" that operates on the 3G standards. Thus, in the illustrated example, mobile device 100-1 is accessing the communication network 120 using a 3G connection to the network of "Network Provider A." Similarly, mobile device 100-2 is connected to base station 110-2. Thus, mobile device 100-2 is accessing the communication network 120 using a 4G connection to the network of "Network Provider A." Furthermore, mobile device 100-3 and mobile device 100-N access the communication network 120 using the networks of "Network Provider B" via base stations 110-3 and 110-M, respectively, when mobile device 100-3 is using a 2G connection and mobile device 100-N is using a 4G connection to the network of "Network Provider B" to access the communication network 120.

It should be appreciated that a mobile device 100 may have more than one antenna, each of which allow the mobile device 100 to connect to the communication network 120 using a different connection type. For example, while mobile device 100-1 is shown as accessing the communication network 120 using a 3G connection, mobile device 100-1 may include antennas which allow mobile device 100-1 to access the communication network 120 using a 4G connection, a 2G connection, and/or a Wi-Fi connection.

One significant difference between the different connection types is the latency values that are realized by a mobile device 100 when using the different connection types. In some embodiments, a latency value can define an amount of time that lapses between a mobile device 100 transmitting a network operation to another network device, e.g., a web server, and the mobile device 100 receiving a response from the other network device. The foregoing is an example of a "round-trip" latency value. The term latency value may also apply to "one-way" latency values, to the extent that determining such values is feasible. The realized latency values can be represented in seconds, milliseconds, or any other suitable time unit. A mobile device 100 can be configured to timeout a network operation when the latency value of the network operation exceeds a timeout value. As described above, a timeout value defines an amount of time that a mobile device 100 waits for a response to a network operation before timing out the network operation.

As should be appreciated, mobile devices 100 performing network operations on a 4G network may realize lesser latency values than when performing network operations on a 2G or 3G network. Thus, according to some embodiments of the present disclosure, a mobile device 100 can be configured with different timeout values for the different connection types supported by the mobile device 100. For instance, a mobile device 100 may be configured to utilize a first timeout value when connected to the 4G network of a network provider, a second timeout value when connected to the 3G network of the network provider, and a third timeout value when connected to the 2G network of the network provider.

As will be discussed in greater detail below, the timeout values of the mobile device 100 can be optimized according to one or more attributes corresponding to the mobile device 100. As used herein, the term "attribute" can refer to any property of or corresponding to the mobile device 100 that may affect the latency values realized by the mobile device 100. A non-limiting list of attributes can include: (i) the network provider of the mobile device 100, (ii) the connection type being utilized by the mobile device 100, (iii) the device type of the mobile device 100, (iv) an operating system version of the mobile device 100, (v) the geographic area of the mobile device 100, and (vi) the type of network operation being performed by the mobile device 100.

The network provider of a mobile device 100 can refer to the entity which furnishes the network by which the mobile device 100 accesses the communication network 120. As should be appreciated, different network providers may utilize different hardware, software, and materials to implement their respective networks, all of which may affect the latency values realized by the mobile device 100. Furthermore, some network providers may implement bandwidth throttling while others may not, which may affect latency values realized by the mobile device 100. Bandwidth throttling describes a scenario where a network provider intentionally reduces the available bandwidth to one or more mobile device 100 to reduce congestion on its network. Thus, the network provider of the mobile device 100 may impact the latency values realized by the mobile device 100.

The connection type of a mobile device 100 can refer to a type of connection that is being utilized by the mobile device 100 to access the communication network 120. As explained above, the connection type that a mobile device 100 uses to access the communication network 120 affects the latency values realized by the mobile device 100.

The device type of the mobile device 100 can refer to a make and model of the mobile device 100. As should be appreciated, different device manufacturers may use different hardware components in different mobile devices 100. Similarly, a manufacturer of mobile devices 100 may use different hardware components in different models. For example, different mobile devices 100 may have different amounts of memory, different processors, and/or different antennas. These differences may ultimately affect the latency values realized by the mobile device 100.

The geographic area of the mobile device 100 can refer to a region or area from which the mobile device 100 performs a network operation. The geographic area may alternatively correspond to a particular base station 110 that a mobile device 100 is utilizing to perform a network operation. As should be appreciated, some areas may be densely populated, e.g., New York City, San Francisco, Mexico City, and Tokyo. While a network provider may erect many base stations 110 throughout the area, many mobile devices 100 may nonetheless attempt to perform network operations using the same base station 110. Such a scenario may affect the bandwidth available to the mobile device 100, which may affect the latency values realized by the mobile device 100. Similarly, in less populated areas, e.g., rural areas, base stations 110 may be sparsely located, as demand for the base stations 110 may not be great. The distance between a mobile device 100 and a base station 110 can affect the signal strength realized by the mobile device 100, which also affects the latency values realized by the mobile device 100.

The operating system version of a mobile device 100 can refer to the version of an operating system that is executed by the mobile device 100. For example, a more current version of an operating system may be optimized to better handle communications using a particular connection type than a less current version. Thus, the operating system version of the mobile device 100 may also affect the latency values realized by the mobile device 100.

An operation type can refer to the type of operation being performed by the mobile device 100. Examples of different operation types include "ping" operations, media stream requests, purchase requests, and URL requests. As should be appreciated, a "ping" operation is a request for a response packet from a network device. Typically, a network device receiving a "ping" responds by sending a response packet to the device which initiated the "ping" operation, which requires very little time to perform. A purchase operation may be an operation associated with an on-line purchase. Typically, performing a purchase operation may include sending an encrypted purchase request to a network device. As should be appreciated, the purchase request may include sensitive data such as the credit card information of a user. In order to respond to a purchase request, the network device receiving the purchase request may have to decrypt the purchase request and verify the information contained in the purchase request before sending a response to the mobile device 100. Accordingly, responding to a purchase request may require more time than responding to a "ping." Thus, the operation type being performed by the mobile device 100 may affect the latency values realized by the mobile device 100.

Figure 2:
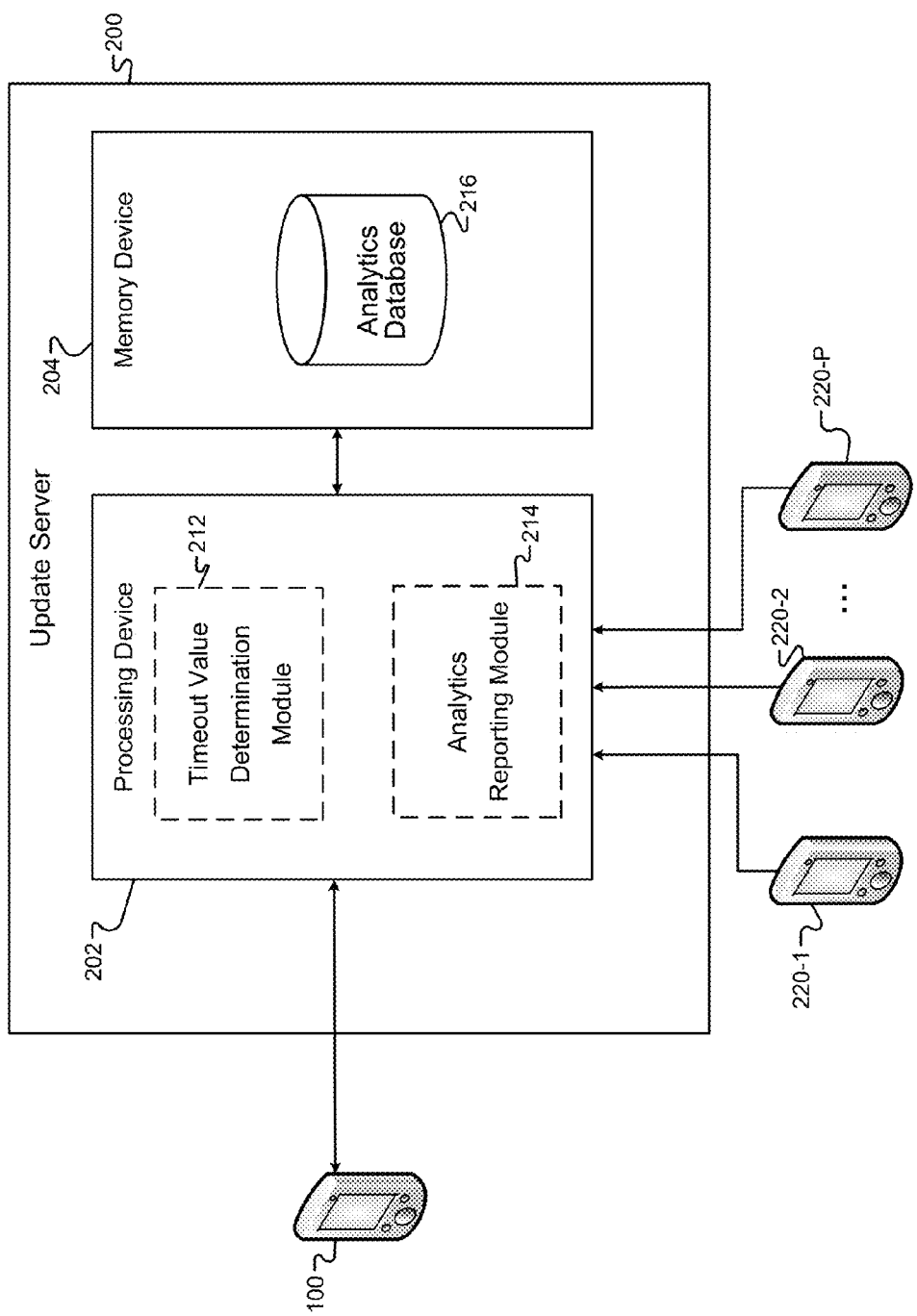
FIG. 2 is a drawing illustrating example components of an update server that is in communication with a plurality of mobile devices according to some embodiments of the present disclosure.

Referring now to FIG. 2, an update server 200 configured to determine one or more timeout values for a mobile device 100 is illustrated. In the illustrative embodiment, the update server 200 includes a processing device 202 and a memory device 204. It should be appreciated that the update server 200 can include other hardware components which are not shown.

As used herein, the term "processing device" can include one or more processors and memory (e.g., RAM and/or ROM). In embodiments where the processing device 202 includes two or more processors, the two or more processors can operate in an individual or distributed manner. The processing device 202 can execute a timeout value determination module 212 and an analytics reporting module 214. The processing device 202 may execute additional modules that perform additional functions such as determining available software updates for a mobile device 100 and providing the software updates to the mobile device 100. The memory device 204 can be any permanent storage medium that is accessible by the processing device 202. In some embodiments, the memory device 204 can store an analytics database 216.

In some embodiments, the analytics reporting module 214 is configured to receive analytical data corresponding to previously performed network operations, which may be stored in the analytics database 216. The analytics reporting module 214 may receive the analytical data from a plurality of reporting mobile devices, e.g., reporting mobile devices 220-1, 220-2 . . . 220-P (generically referred to as a "reporting mobile device 220"). After performing a network operation, a reporting mobile device 220 can report the analytical data corresponding to the previously performed network operation. A previously performed network operation can include any network operation where the reporting mobile device 220 communicates at least one data packet to another device via the communication network 120. For example, a previously performed network operation can include a "ping" operation, a request for a media stream, a URL-request, a purchase request, or any other suitable communication. The reporting mobile device 220 may provide the analytical data to the analytics reporting module 214 after each performed network operation. Alternatively, the reporting mobile device 220 can provide analytical data in batches after performing multiple network operations.

The analytical data corresponding to a previously performed network operation can include a realized latency value corresponding to the previously performed network operation and one or more attributes of the reporting mobile device 220. The attributes of the reporting mobile device 220 can include a network provider of the reporting mobile device 220, a connection type used by the reporting mobile device 220 to access the communication network 120 when performing the previously performed network operation, a device type of the reporting mobile device 220, a geographic area of the reporting mobile device 220, an operating system of the reporting mobile device 220, and/or an operation type of the previously performed network operation. It is noted that the foregoing list of attributes is not exhaustive and other attributes of the reporting mobile device 220 may also be reported.

Upon receiving analytical data corresponding to a previously performed network operation from a reporting mobile device 220, the analytics reporting module 214 can transfer the realized latency value included in the analytical data to the analytics database 216 for storage. The analytics reporting module 214 can further transfer the attributes of the reporting mobile device 220 to the analytics database 216 for storage and association with the realized latency value. For example, the analytics reporting module 214 can create a database entry containing the realized latency value and the attributes of the reporting mobile device 220. Alternatively, the analytics reporting module 214 can tag the realized latency value with an identifier for each of the other analytical data types, e.g., an identifier corresponding to the network provider and another identifier corresponding to the connection type.

The analytics database 216 stores a plurality of realized latency values, such that each one of the realized latency values corresponds to a different previously performed network operation performed by one of a plurality of reporting mobile devices 220. Furthermore, the attributes of the specific reporting mobile device 220 which performed the previously performed network operation are associated with the realized latency value. For example, for each realized latency value, a network provider identifier indicating a network provider of a reporting mobile device 220 and a connection type identifier indicating a type of connection used by the reporting mobile device 220 to perform the previously performed network operation are associated with the realized latency value. Table I illustrates an example of realized latency values having analytical data associated therewith:

| Realized Latency Value | Network Provider | Connection Type | Geographic Area | Device Type | Operation Type |
|---|---|---|---|---|---|
| 1.15 s | Provider A | 3G | Chicago, IL | Make A, Model 1 | Media Stream |
| .806 s | Provider A | 3G | New York, NY | Make A, Model 1 | URL Request |
| .187 s | Provider A | 4G | New York, NY | Make A, Model 2 | URL Request |
| .193 s | Provider B | 4G | New York, NY | Make B, Model 1 | Media Stream |
| 1.12 s | Provider B | 3G | Chicago, IL | Make B, Model 1 | Purchase |

Table I is provided for example only and one should appreciate that the analytics database 216 can store thousands, millions, or more realized latency values.

The timeout value determination module 212 receives a request for a timeout value from a mobile device 100 and determines the timeout value based on attributes corresponding to the requesting mobile device 100. The timeout value determination module 212 may executed by the same processor as the analytics reporting module 214 or may be executed by a separate processor.

The request for the timeout value can be received in any suitable manner. For example, the mobile device 100 can provide the request for the timeout value when the mobile device 100 connects to the update server 200 to obtain a list of available software updates for the mobile device 100.

The request for a timeout value may include the attributes of the requesting mobile device 100, including a current network provider indicator indicating a network provider of the mobile device 100 and a current connection type indicator indicating a type of connection used by the mobile device 100 to access the communication network. In some embodiments, the attributes of the mobile device 100 may further include a current device type identifier indicating a make and model of the mobile device 100, a current geographic area identifier indicating a current geographic area of the mobile device 100, a current operating system identifier indicating a current version of the operating system of the mobile device 100, and/or one or more operation identifiers indicating different types of network operations that may be performed by the mobile device 100. It is noted that the current geographic area may correspond to the geographic area in which the mobile device 100 performs the greatest amount of network operations, e.g., a home location or an office location of the user. The current geographic area can be manually entered by the user of the mobile device 100 or can be learned over time by monitoring the locations at which the mobile device 100 performs network operations.

In the illustrated example, the timeout value determination module 212 accesses the analytics database 216 and retrieves one or more realized latency values based on the attributes of the mobile device 100 which provided the request. In some embodiments, the attributes associated with the retrieved realized latency values are the same as the attributes of the requesting mobile device 100. For example, if the request for a timeout value contains a current network provider indicator indicating "Network Provider A" and a current connection type indicator indicating "3G," the timeout value determination module 212 can retrieve all of the realized latency values that are associated with "Network Provider A" and "3G" from the analytics database 216. It should be appreciated that if additional attributes of the mobile device 100 are included in the request, the timeout value determination module 212 can retrieve the realized latency values based on the additional attributes as well. For example, if the request from the example provided above includes a current device type identifier indicating "Brand A, Model 1," and a current geographic area identifier indicating "Chicago, Ill.," the timeout value determination module 212 retrieves the realized latency values which are associated with "Network Provider A," "3G," "Brand A, Model 1," and "Chicago, Ill."

The timeout value determination module 212 determines a timeout value based on the retrieved realized latency values. In some embodiments, the timeout value determination module 212 can select the timeout such that a specific percentage, e.g., 90%, of responses corresponding to the retrieved realized latency values would have been received before network operations corresponding to the retrieved realized latency value would have been timed out by the reporting mobile device 220. Furthermore, the timeout value determination module 212 can be further configured to tune the timeout value to take into account considerations stemming from the variance of the retrieved realized latency values. For instance, if 89% of the of the retrieved realized latency values are less than 200 ms, but 90% of the retrieved realized latency values are less than 400 ms, the timeout value determination module 212 can select 200 ms as the timeout value, as the tradeoff for a one percent reduction in network operations being timed out would require that the timeout value be doubled.

In some embodiments, the timeout value determination module 212 can select the timeout value discussed above by performing a statistical analysis on the retrieved realized latency values. For example, the timeout value determination module 212 can generate a distribution, e.g., a probability distribution or a histogram, based on the retrieved latency values and determine a mean realized latency value, a variance of the distribution, and/or a standard deviation of the distribution. The timeout value determination module 212 can select the timeout value based on the results of the statistical analysis.

In some embodiments, the request for a timeout value can include multiple connection types. In these embodiments, the timeout value determination module 212 can determine a timeout value for each connection type included in the request based on the other attributes contained in the request. The timeout value determination module 212 can then provide the determined timeout values to the requesting mobile device 100.

In some embodiments, the request for a timeout value may include requests for timeout values corresponding to one or more operation types. For example, the requesting mobile device 100 may request a timeout value for purchase operations. In these embodiments, the timeout value determination module 212 retrieves realized latency values associated with the particular operation type, e.g., realized latency values corresponding to purchase operations as well as the other attributes of the requesting mobile device 100. The timeout value determination module 212 can then determine the timeout value for the particular operation type based on the retrieved realized latency values.

It should be appreciated that the reporting mobile devices 220 may request timeout values from the update server 200 and the requesting mobile devices 100 can report analytical data to the update server 200.

The update server 200 described above is an example of an apparatus for determining a timeout value. Variations of the update server 200 are contemplated and are within the scope of the disclosure. For instance, in some embodiments, the update server 200 does not include the analytics reporting module 214 and the analytics database 216. In these embodiments, the analytics database 216 may be located at a different server which is accessed by the timeout value determination module 212 over the communication network 120.

Figure 3:
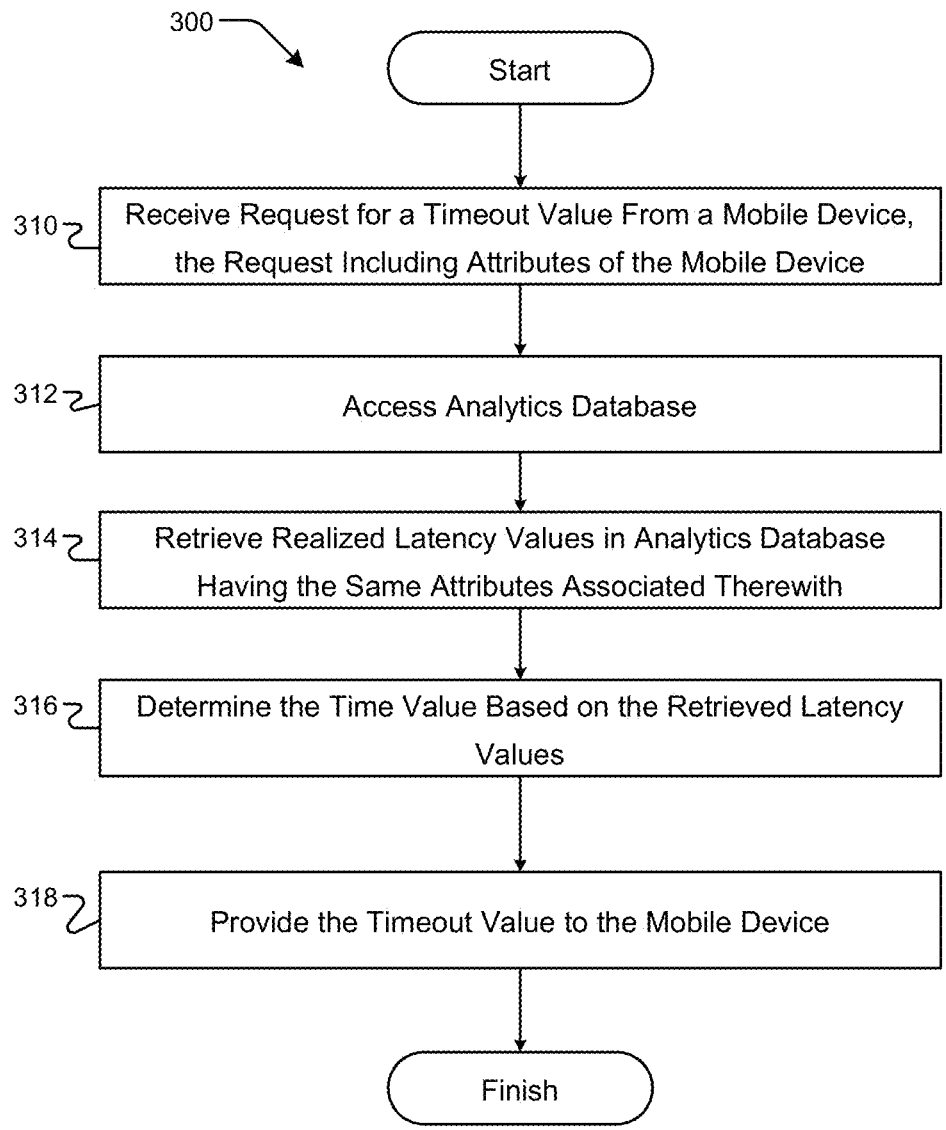
FIG. 3 is a flow chart illustrating an example technique for determining a timeout value for a mobile device according to some embodiments of the present disclosure.

Referring now to FIG. 3, an example technique 300 for determining a timeout value for a mobile device 100 is illustrated. In some embodiments, the technique may be performed by the processing device 202 of the update server 200 (FIG. 2). At 310, the update server 200 receives a request for a timeout value from a mobile device 100. It should be appreciated that the feature of receiving a request for a timeout value from the mobile device 100 can also be implemented as a push-based feature or a hybrid of these two features. More specifically, in some implementations the timeout value may be stored at the mobile device 100 and can be overridden by the update server 200 at any time (the push-based feature) or when certain criteria are met, e.g., based on one or more network parameters (the hybrid feature). The request for a timeout value can be received from the mobile device 100 at the time of determining the timeout value (316 below). Alternatively or additionally, the request can be received by the update server 200 at a time after which the update server 200 may periodically or at various times determine a timeout value to be "pushed" to the mobile device 100. For example only, the request may be received as a registration from the mobile device 100 for an update service. As previously discussed, the request may include attributes of the mobile device 100. The attributes may include a current network provider identifier and a current connection type identifier of the mobile device 100. Further, the attributes may also include one or more of a current geographic area of the mobile device 100, a current device type identifier of the mobile device 100, a current operating system identifier of the mobile device 100, and one or more operation identifiers.

At 312, the update server 200 accesses the analytics database 216. In accessing the analytics database 216, the update server 200 can search for any realized latency values that have the attributes of the requesting mobile device 100 associated therewith. For example, the update server 200 can search for all the realized latency values which have the current network provider identifier and the current connection type identifier associated therewith. At 314, the update server 200 retrieves the realized latency values having the attributes of the requesting mobile device 100 associated therewith from the analytics database 216.

At 316, the update server 200 determines a timeout value based on the retrieved latency values. The update server 200 can determine the timeout value in any suitable manner. For example, the update server 200 can selecting a timeout value such that a specific percentage of responses corresponding to the retrieved realized latency values would have been received before network operations corresponding to the retrieved realized latency value would have been timed out by the reporting mobile device 220. In some embodiments, the update server 200 select the timeout value by performing a statistical analysis on a distribution representing the retrieved realized timeout values. At 318, the update server 200 provides the determined timeout value to the mobile device 100.

As discussed above, the request for a timeout value may include more than one connection type. In such a scenario, the update server 200 may repeat the technique 300 described above for each connection type included in the request.

The technique 300 illustrated in FIG. 3 is provided for example only. Variations of the technique 300 are contemplated and are within the scope of the disclosure. Furthermore, while the technique 300 is described as being performed by an update server 200, the technique 300 may be performed by any other suitable computing device, including the requesting mobile device 100. If the technique is performed by the mobile device 100, the request for the timeout value is an internal request and the mobile device 100 may access the analytics database 216 via the communication network 120.

Figure 4:
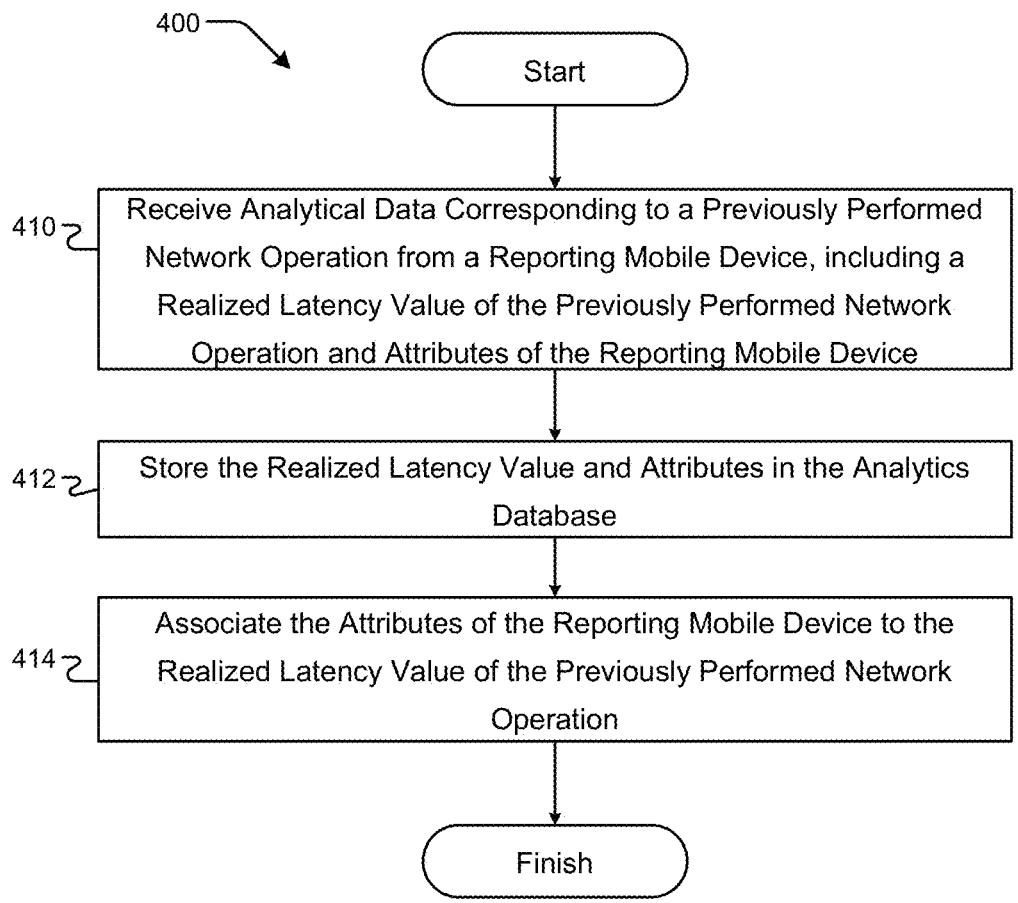
FIG. 4 is a flow chart illustrating an example technique for obtaining and storing analytical data corresponding to a previously performed network operation according to some embodiments of the present disclosure.

Referring now to FIG. 4, an example technique 400 for reporting realized latency values is illustrated. In some embodiments, the technique 400 may be performed by the processing device 202 of the update server 200 (FIG. 2). In other embodiments, the technique may be performed by a server that is remote to the update server 200. For purposes of explanation, however, the technique 400 is explained as being executed by the update server 200.

At 410, the update server 200 receives analytical data corresponding to a previously performed network operation from a reporting mobile device 220. The analytical data includes a realized latency value of the previously performed network operation and attributes of the reporting mobile device 220. As discussed, the attributes of the reporting mobile device 220 may include a network provider of the reporting mobile device 220, a connection type of the reporting mobile device 220, a device type of the reporting mobile device 220, an operation system version of the reporting mobile device 220, a geographic area of the reporting mobile device 220, and an operation type of the previously performed network operation.

At 412, the update server 200 stores the realized latency value and the attributes of the reporting mobile device 220 in the analytics database 216. At 414, the update server 200 associates the attributes of the reporting mobile device 220 to the realized latency value. In some embodiments, the update server 200 may tag the realized latency value with attributes of the reporting mobile device 220. Alternatively, the update server 200 may create a database entry which includes the realized latency value and the attributes of the reporting mobile device 220.

The technique 400 illustrated in FIG. 4 is provided for example only. Variations of the technique 400 are contemplated and are within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method comprising:
receiving, at a processing device of a computing device, a request for a timeout value from a mobile device, the request including a current network provider identifier indicating a current network provider of the mobile device and a first current connection type identifier indicating a first type of connection used by the mobile device to access a communication network, the timeout value being indicative of an amount of time that the mobile device waits for a response to a network operation before timing out the network operation when using the first type of connection to access the communication network;
accessing, at the computing device, an analytics database, the analytics database storing a plurality of realized latency values, each realized latency value corresponding to a different previously performed network operation performed by one of a plurality of reporting mobile devices and defining a realized latency value of the previously performed network operation, each realized latency value having associated therewith a network provider identifier indicating a network provider of the reporting mobile device used to perform the previously performed network operation and a connection type identifier indicating a type of connection used by the reporting mobile device to perform the previously performed network operation;
retrieving, at the computing device, one or more of the plurality of realized latency values from the analytics database based on the current network provider identifier and the first connection type identifier, each of the one or more retrieved realized latency values having the current network provider identifier and the first current connection type identifier associated therewith;
determining, at the computing device, the timeout value based on the one or more retrieved realized latency values; and
providing, at the computing device, the timeout value to the mobile device.

2. The method of claim 1, further comprising:
receiving, at the computing device, a new realized latency value, a new network provider identifier, and a new connection type identifier from one of the plurality of reporting mobile devices;
storing, at the computing device, the new realized latency value, the new network provider identifier, and the new connection type identifier in the analytics database; and
associating, at the computing device, the new network provider identifier and the new connection type identifier with the new realized latency value.

3. The method of claim 1, wherein each one of the plurality of realized latency values stored in the analytics database has a device type identifier associated therewith, the device type identifier indicating a make and model of the one reporting mobile device that performed the previously performed network operation to which the realized latency value corresponds.

4. The method of claim 3, wherein:
the request for the timeout value includes a current device type identifier of the mobile device indicating a current make and model of the mobile device, and
each of the one or more retrieved realized latency values have the current device type identifier associated therewith.

5. The method of claim 1, wherein the request includes a request for a second timeout value and a second current connection type identifier indicating a second type of connection used by the mobile device to access the communication network, the second timeout value being indicative of a second amount of time that the mobile device waits for a response to a second network operation before timing out the second network operation when using the second type of connection to access the communication network.

6. The method of claim 5, further comprising:
retrieving, at the computing device, one or more other realized latency values from the analytics database based on the current network provider identifier and the second current connection type identifier, each of the one or more other realized latency values having the current network provider identifier and the second current connection type identifier associated therewith;
determining, at the computing device, the second timeout value based on the other realized latency values; and
providing, at the computing device, the second timeout value to the mobile device.

7. The method of claim 1, wherein each one of the plurality of realized latency values stored in the analytics database has a geographic area identifier associated therewith, the geographic area identifier indicating a geographic area from which the one reporting mobile device performed the previously performed network operation to which the realized latency value corresponds.

8. The method of claim 7, wherein:
the request for the timeout value includes a current geographic area identifier of the mobile device indicating a geographic area where the mobile device most frequently performs network operations, and
each of the one or more retrieved realized latency values have the current geographic area identifier associated therewith.

9. The method of claim 1, wherein determining the timeout value further includes selecting the timeout such that a specific percentage of responses corresponding to the retrieved realized latency values would have been received before network operations corresponding to the retrieved realized latency value would have been timed by the reporting mobile device.

10. The method of claim 1, wherein the computing device is one of the mobile device and an update server.

11. A computing device, comprising:
an analytics database that stores a plurality of realized latency values, each realized latency value corresponding to a different previously performed network operation performed by one of a plurality of reporting mobile devices and defining a realized latency value of the previously performed network operation, each realized latency value having associated therewith a network provider identifier indicating a network provider of the reporting mobile device used to perform the previously performed network operation and a connection type identifier indicating a type of connection used by the reporting mobile device to perform the previously performed network operation;
a processing device configured to:
receive a request for a timeout value from a mobile device, the request including a current network provider identifier indicating a current network provider of the mobile device and a first current connection type identifier indicating a first type of connection used by the mobile device to access a communication network, the timeout value being indicative of an amount of time that the mobile device waits for a response to a network operation before timing out the network operation when using the first type of connection to access the communication network;
access the analytics database;
retrieve one or more of the plurality of realized latency values from the analytics database based on the current network provider identifier and the first connection type identifier, each of the one or more retrieved realized latency values having the current network provider identifier and the first current connection type identifier associated therewith;
determine the timeout value based on the one or more retrieved realized latency values; and
provide the timeout value to the mobile device.

12. The computing device of claim 11, wherein the processing device is further configured to:
receive a new realized latency value, a new network provider identifier, and a new connection type identifier from one of the plurality of reporting mobile devices;
store the new realized latency value, the new network provider identifier, and the new connection type identifier in the analytics database; and
associate the new network provider identifier and the new connection type identifier with the new realized latency value.

13. The computing device of claim 11, wherein each one of the plurality of realized latency values stored in the analytics database has a device type identifier associated therewith, the device type identifier indicating a make and model of the one reporting mobile device that performed the previously performed network operation to which the realized latency value corresponds.

14. The computing device of claim 13, wherein:
the request for the timeout value includes a current device type identifier of the mobile device indicating a current make and model of the mobile device, and
each of the one or more retrieved realized latency values have the current device type identifier associated therewith.

15. The computing device of claim 11, wherein the request includes a request for a second timeout value and a second current connection type identifier indicating a second type of connection used by the mobile device to access the communication network, the second timeout value indicating a second maximum amount of time that the mobile device waits for a response to a second network operation before timing out the second network operation when using the second type of connection to access the communication network.

16. The computing device of claim 15, wherein the processing device is further configured to:
retrieve one or more other realized latency values from the analytics database based on the current network provider identifier and the second current connection type identifier, each of the one or more other realized latency values having the current network provider identifier and the second current connection type identifier associated therewith;
determine the second timeout value based on the other realized latency values; and
provide the second timeout value to the mobile device.

17. The computing device of claim 11, wherein each one of the plurality of realized latency values stored in the analytics database has a geographic area identifier associated therewith, the geographic area identifier indicating a geographic area from which the one reporting mobile device performed the previously performed network operation to which the realized latency value corresponds.

18. The computing device of claim 17, wherein:
the request for the timeout value includes a current geographic area identifier of the mobile device indicating a geographic area where the mobile device most frequently performs network operations, and
each of the one or more retrieved realized latency values have the current geographic area identifier associated therewith.

19. The computing device of claim 11, wherein the processing device is configured to determine the timeout value by selecting the timeout such that a specific percentage of responses corresponding to the retrieved realized latency values would have been received before network operations corresponding to the retrieved realized latency value would have been timed by the reporting mobile device.

20. The computing device of claim 11, wherein the computing device is one of the mobile device and an update server.

* * * * *